US008135883B2

(12) United States Patent  
Monks et al.

(10) Patent No.: US 8,135,883 B2  
(45) Date of Patent: Mar. 13, 2012

(54) USB HUB APPARATUS SUPPORTING MULTIPLE HIGH SPEED DEVICES AND A SINGLE SUPER SPEED DEVICE

(75) Inventors: Morgan H. Monks, Tempe, AZ (US); Terry R. Altmayer, Chandler, AZ (US); Satish N. Anand, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 6 days.

(21) Appl. No.: 12/788,385

(22) Filed: May 27, 2010

(65) Prior Publication Data

US 2011/0179201 A1 Jul. 21, 2011

Related U.S. Application Data

(60) Provisional application No. 61/296,338, filed on Jan. 19, 2010.

(51) Int. Cl.  
*G06F 13/14* (2006.01)

(52) U.S. Cl. ............................................. 710/38; 710/64

(58) Field of Classification Search ........................ None  
See application file for complete search history.

(56) References Cited

U.S. PATENT DOCUMENTS

| 6,738,834 | B1 | 5/2004 | Williams et al. |
| 7,185,126 | B2 | 2/2007 | Szabelski |
| 7,213,766 | B2 * | 5/2007 | Ryan et al. .................... 235/492 |
| 7,484,018 | B2 | 1/2009 | Szabelski |
| 7,762,470 | B2 * | 7/2010 | Finn et al. ...................... 235/492 |
| 7,788,428 | B2 * | 8/2010 | Melin .............................. 710/62 |
| 7,996,586 | B2 * | 8/2011 | Liu .................................. 710/36 |
| 2005/0235091 | A1 | 10/2005 | Chen et al. |
| 2005/0278472 | A1 * | 12/2005 | Gierke ........................... 710/313 |
| 2006/0056401 | A1 | 3/2006 | Bohm et al. |
| 2006/0059293 | A1 | 3/2006 | Wurzburg et al. |
| 2007/0132733 | A1 * | 6/2007 | Ram ............................... 345/163 |

(Continued)

FOREIGN PATENT DOCUMENTS

WO 2010132938 11/2010

OTHER PUBLICATIONS

Universal Serial Bus 3.0 Specification, Revision 1.0; Nov. 12, 2008, 482 pages; Parts 1, 2, and 3.

(Continued)

*Primary Examiner* — Cheng-Yuan Tseng  
(74) *Attorney, Agent, or Firm* — Meyertons Hood Kivlin Kowert & Goetzel, P.C.; Jeffrey C. Hood; Joel L. Stevens

(57) ABSTRACT

Hub apparatus that supports multiple high speed devices and a super speed device. The hub apparatus may include at least one upstream port for coupling to a host device and at least one downstream port for coupling to at least one downstream device. The hub apparatus may further include an embedded device as well as an internal hub coupled to the upstream port, the embedded device, and the at least one downstream port. The internal hub may be configured to provide a connection between the host device and the embedded device at a first speed (e.g., USB high speed). However, when supported by the host device, the embedded device may communicate with the host device at a higher speed than the first speed (e.g., USB super speed), e.g., without using the internal hub.

22 Claims, 11 Drawing Sheets

U.S. PATENT DOCUMENTS

| | | | |
|---|---|---|---|
| 2009/0199031 A1 | 8/2009 | Zhang et al. | |
| 2009/0200367 A1* | 8/2009 | Arnouse | 235/375 |
| 2009/0248924 A1* | 10/2009 | Melin | 710/63 |
| 2009/0327536 A1 | 12/2009 | Solomon et al. | |
| 2010/0049895 A1 | 2/2010 | Liang | |
| 2010/0076616 A1* | 3/2010 | Kagan | 700/295 |
| 2011/0087806 A1* | 4/2011 | Mohanty et al. | 710/16 |
| 2011/0179201 A1* | 7/2011 | Monks et al. | 710/60 |
| 2011/0219272 A1* | 9/2011 | Lai et al. | 714/54 |

OTHER PUBLICATIONS

International Search Report mailed Mar. 30, 2011 for PCT/US2010/061281.

International Written Opinion mailed Mar. 30, 2011 for PCT/US2010/061281.

PCT/US2010/61281 filed on Dec. 20, 2010, 29 pages.

* cited by examiner

USB HUB APPARATUS SUPPORTING MULTIPLE HIGH SPEED DEVICES AND A SINGLE SUPER SPEED DEVICE

PRIORITY INFORMATION

This application claims benefit of priority of U.S. provisional application Ser. No. 61/296,338 titled "USB Hub Supporting High Speed and Super Speed Devices" filed Jan. 19, 2010, whose inventors were Morgan H. Monks, Terry R. Altmayer, and Satish N. Anand, which is hereby incorporated by reference in its entirety as though fully and completely set forth herein.

FIELD OF THE INVENTION

The present invention relates to the field of hubs, and more particularly to a universal serial bus (USB) hub supporting high speed and super speed devices.

DESCRIPTION OF THE RELATED ART

In recent years, there has been a proliferation of USB devices. For example, many people own or purchase various portable devices such as cell phones, music players, video players, and cameras, among other devices. Accordingly, there has been pressure to increase transfer and communication speeds between USB devices, e.g., between a host computer and USB devices. To achieve this goal, industry has begun adopting the new super speed USB standard. However, devices wishing to adopt the new standard also need to be compatible with previous USB standards (e.g., USB 2.0). Accordingly, improvements in USB devices are desired.

SUMMARY OF THE INVENTION

Various embodiments are presented of a hub that supports high speed devices and an additional super speed device.

The hub apparatus may be a new form of USB hub and may include an upstream port for coupling to a host device and at least one downstream port for coupling to a respective at least one downstream high speed/full speed/low speed device. The downstream devices may be external or embedded. The hub apparatus may further include an embedded device. The embedded device may include a card reader, may provide an Ethernet connection (e.g., Gig E), and/or may provide a hard drive connection (e.g., a SATA, SCSI, IDE, etc. interface), among other possibilities. In some embodiments, the embedded device may be capable of USB full speed/high speed/ super speed. Additionally, the embedded device may be capable of operating at super speed and high speed or full speed simultaneously. The embedded device may be coupled to the upstream port of the hub apparatus, e.g., for interacting with the host device at super speed.

The USB hub apparatus may also include an internal hub coupled to the upstream port, the embedded device, and the at least one downstream port. The internal hub may be a USB high speed hub configured to provide a connection between the host device and the embedded device at a first speed (e.g., USB high speed) and provide a connection between the host device and the downstream port(s) at the first speed. The first speed may be a lower speed (e.g., at full speed or high speed) than the speed described above (e.g., super speed).

Thus, the embedded device may operate at a higher speed when supported by the host device; however, the embedded device may operate at the first speed when the higher speed is not supported by the host device.

In further embodiments, the embedded device is further configured to communicate with the host device at the higher speed based on criteria in addition to the support of the host device of the higher speed. For example, the criteria may be based on a battery level of the system containing the USB hub apparatus and/or the embedded device and/or the data or bandwidth for transfer between the embedded device and the host device. Other criteria are envisioned.

BRIEF DESCRIPTION OF THE DRAWINGS

A better understanding of the present invention can be obtained when the following detailed description of the preferred embodiment is considered in conjunction with the following drawings, in which.

Figure 1:
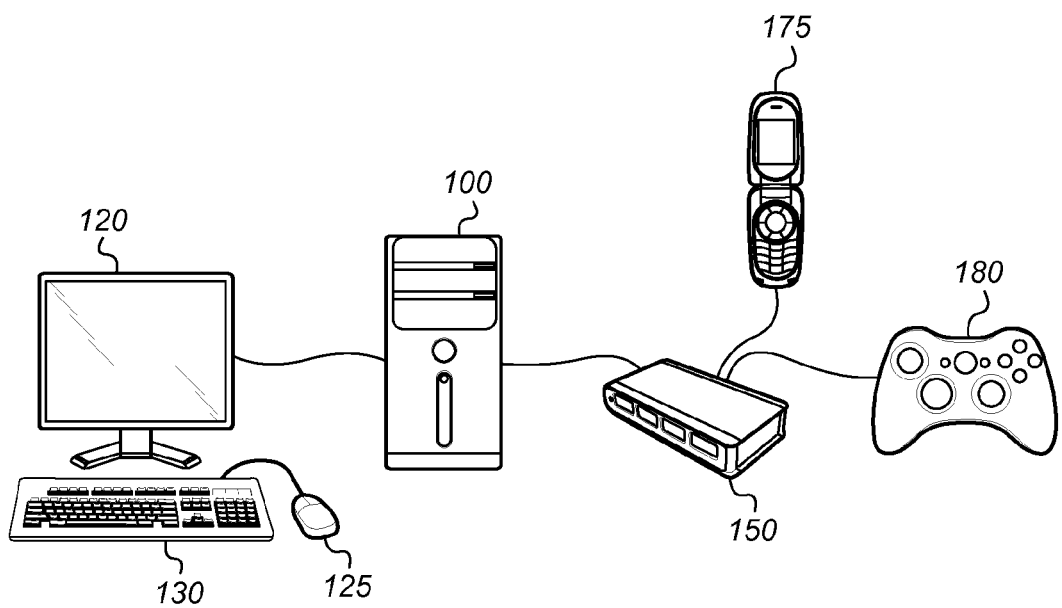
FIG. 1 illustrates an exemplary system suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a Flash, magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Portable Device—any of various types of portable computing devices, including cell or mobile phones (including smart phones), PDAs, digital cameras, portable media players, netbooks, etc. In general, the term "portable device" can be defined to encompass devices (or combinations thereof) which include at least one processor that executes instructions from a memory medium and is easily carried (e.g., handheld) by a user.

FIG. 1—Exemplary Systems

FIG. 1 illustrates one embodiment of an exemplary system configured to allow for both super speed and high speed connections between a host device (such as a computer system) and USB devices (e.g., portable USB devices). As shown, the host device 100 may be coupled to hub 150. As described herein the hub 150 may be a USB hub that supports both super speeds and legacy speeds (e.g., high speed and/or full speed).

The hub 150 may be used to couple to a plurality of devices, e.g., USB devices. For example, the devices may include portable devices, such as a cell or mobile phone (e.g., a flip phone with an LCD display, a single screen phone, such as a Blackberry™ or iPhone™, among others), a personal media player (e.g., an mp3 player, and/or an IPOD™, among other players, a CD player, a digital video player, a DVD player, etc.), a digital camera, a netbook, etc. Alternatively, or additionally, the devices may be user interface devices, such as mice, keyboards, game controllers, etc. Note that any of various USB devices are envisioned.

As shown in the exemplary embodiment of FIG. 1, the hub 150 may be coupled to a first device 175 (in this case, a cell phone) and a second device 180 (in this case a game controller). However, one or more of devices (e.g., USB devices) may also be included within the enclosure of the hub 150. For example, the hub 150 may include an enclosed or embedded device such as a memory medium, or a reader of external memory mediums (e.g., a card reader for memory cards, such as flash cards), and may be incorporated within the hub 150. As another example, the hub 150 may include an embedded network adapter (e.g., a USB Ethernet adapter, such as GigE). Further, the hub 150 may include an embedded hard drive adapter (e.g., providing a SATA connection for a hard drive).

The host device 100 may include at least one memory medium on which one or more computer programs or software components may be stored. For example, the memory medium may store operating system software, as well as other software for operation of the host device 100. Various embodiments further include receiving or storing instructions and/or data implemented in accordance with the foregoing description upon a carrier medium.

Note that the exemplary host device 100 is shown as a computer system (e.g., as shown, with input devices 125 and 130 and display 120). However, in other embodiments, the host device 100 may be a portable USB device, e.g., similar to the mobile device 175, among others. For example, in one embodiment, the host device 100 may be a USB on-the-go (OTG) device which may be operable to act as a host and a device, e.g., depending on the situation. Thus, according to various embodiments the host device 100 may be any of various appropriate devices.

Note further that the above descriptions of the external device 100, the hub 150, and the devices 175 and 180 are exemplary only and other components and configurations are envisioned. For example, the hub 150 may be incorporated into one or more other devices, such as the input device 130, the display 120, or another device, as desired. Thus, FIG. 1 illustrates an exemplary system according to some embodiments.

Figure 2A:
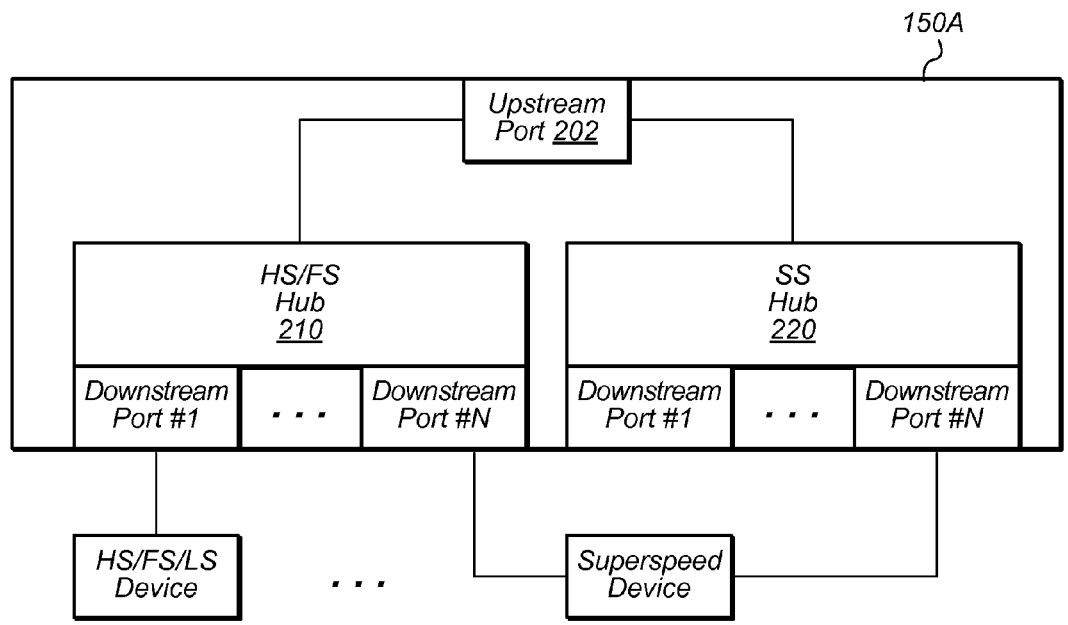
FIGS. 2A-2B are exemplary block diagrams of a standard USB hub and USB compound device including a high speed and super speed hub, according to one embodiment.
Figure 2B:
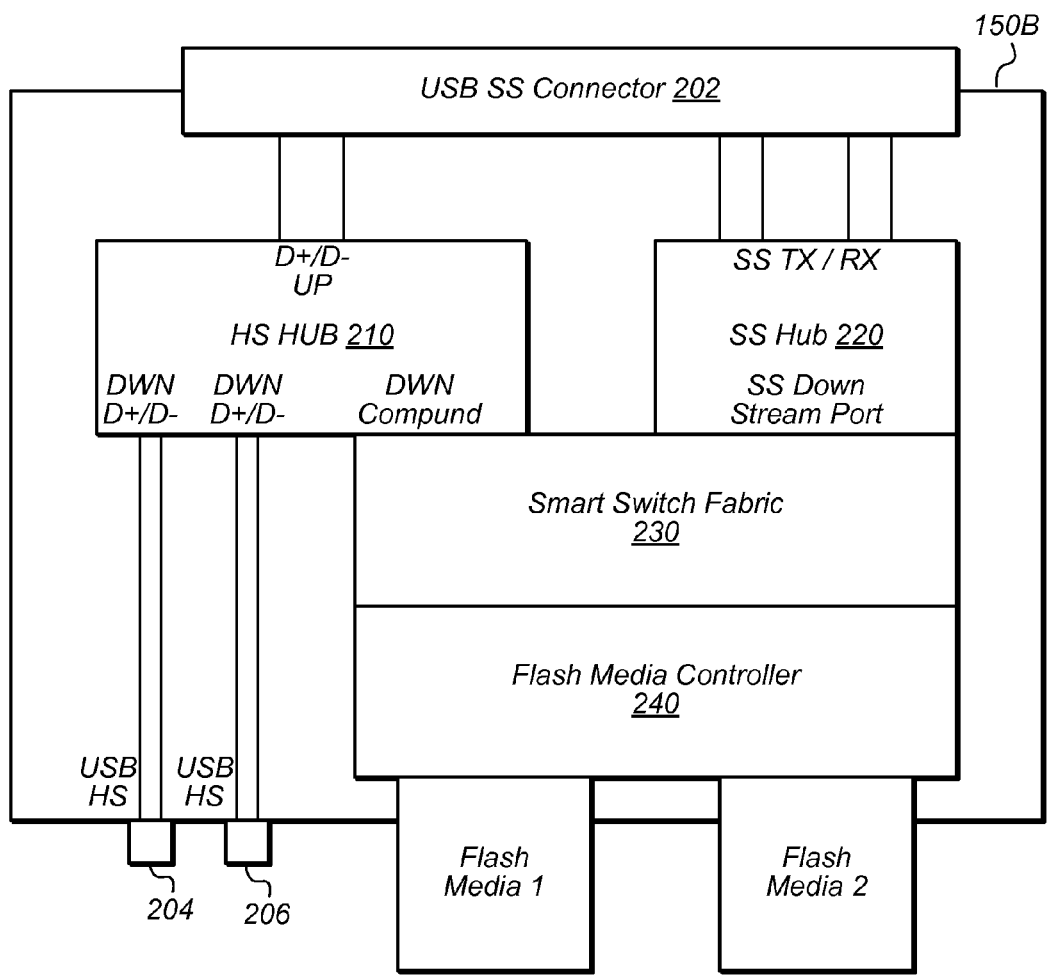

FIGS. 2A and 2B—Hub Including High Speed and Super Speed Hubs

FIGS. 2A and 2B are exemplary block diagrams of the hub (150A and 150B, respectively). As shown, each embodiment of the hub 150 includes both a high speed and super speed internal hub. FIG. 2A shows a generalized, standard hub 150A which includes both a high speed/full speed hub 210 and a super speed hub 220. As also shown, the hub 150A includes a single upstream port 202 which may be used to couple to the host device 100. As also shown, the upstream port 202 is coupled to both the high speed hub 210 and the super speed hub 220. Additionally, in the embodiment shown in FIG. 2A, a high speed/full speed/low speed device is coupled to downstream port 1 of high speed hub 210 and a super speed device is coupled to downstream port N of super speed hub 220. However, because the super speed device is compatible with high speed (according to USB 3.0 specification), the super speed device may also be coupled to downstream port N of the high speed hub 210. Note that the connection to both ports may be via a single physical port of the hub 150A and single connector from the super speed device. Additionally, the super speed device may be embedded in the hub 150A (or B), as indicated below.

FIG. 2B illustrates a more specific embodiment of the hub (150B) which includes the high speed hub 210 and the super speed hub 220. Similar to FIG. 2A, a single connector (port) 202 is included for both the high speed hub 210 and the super speed hub 220. Additionally, the hub 150B includes two high speed (or HS/FS) downstream ports 204 and 206. More specifically, the two high speed downstream ports 204 and 206 may be used to connect to legacy SOC devices such as a baseband or other USB devices which have a present USB stack in HS or FS. However, instead of including super speed downstream ports, a smart switch fabric 230 is coupled to the high speed hub 210 and the super speed hub 220. Coupled to the smart switch fabric 230 is an embedded flash media controller 240, which in turn couples to flash media 1 and flash media 2. More specifically, in one embodiment, below the super speed hub 220, the flash media controller 240 may have a captive or compound super speed flash media device.

The smart switch fabric 230 may allow the flash media controller 240 (and consequently, flash media 1 and 2) to be accessed by either the high speed hub 210 and/or the super speed hub 220. More specifically, if the host device 100 supports super speed connections, the flash media may be accessed via super speed hub 220; however, if the host device 100 does not support super speed connections, the flash media may be accessed via high speed hub 210. Thus, depending on the host's abilities, the smart switch fabric 230 may arbitrate control of the flash media controller 240 between the high speed hub 210 and the super speed hub 220. In further embodiments, the host device may access the flash media via both speeds simultaneously (e.g., where the first media is accessed via high speed and the second media is accessed via super speed), depending on the situation.

However, one issue with the standard hub implementation shown in FIG. 2A and the embodiment shown in FIG. 2B is that the super speed hub 220 does not need to propagate super speed signals from the high speed/full speed/low speed downstream devices to an external connector. Thus, considerable size and power is wasted in the numerous layers of the super speed hub 220.

Figure 3A:
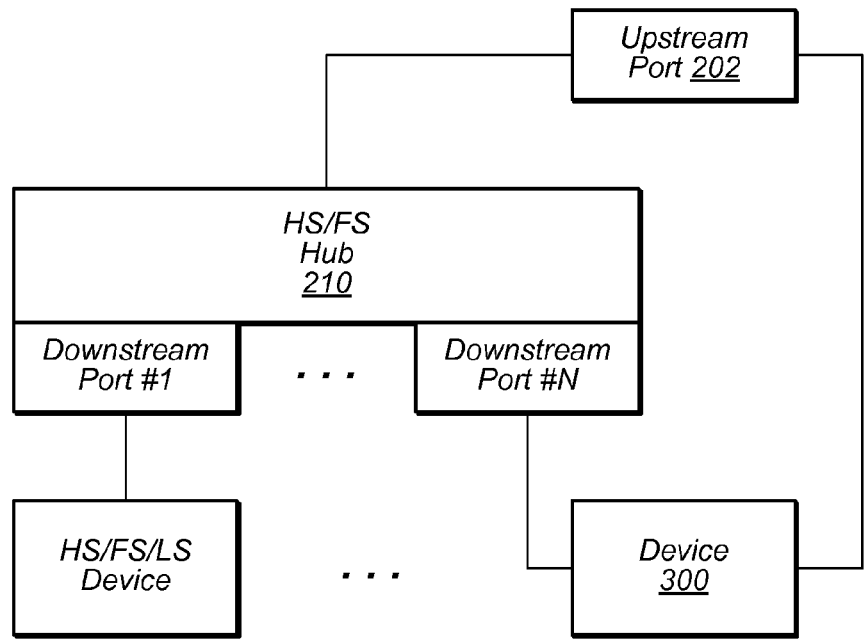
FIGS. 3A-3B are exemplary block diagrams of a hub apparatus including a high speed hub and a super speed device.
Figure 3B:
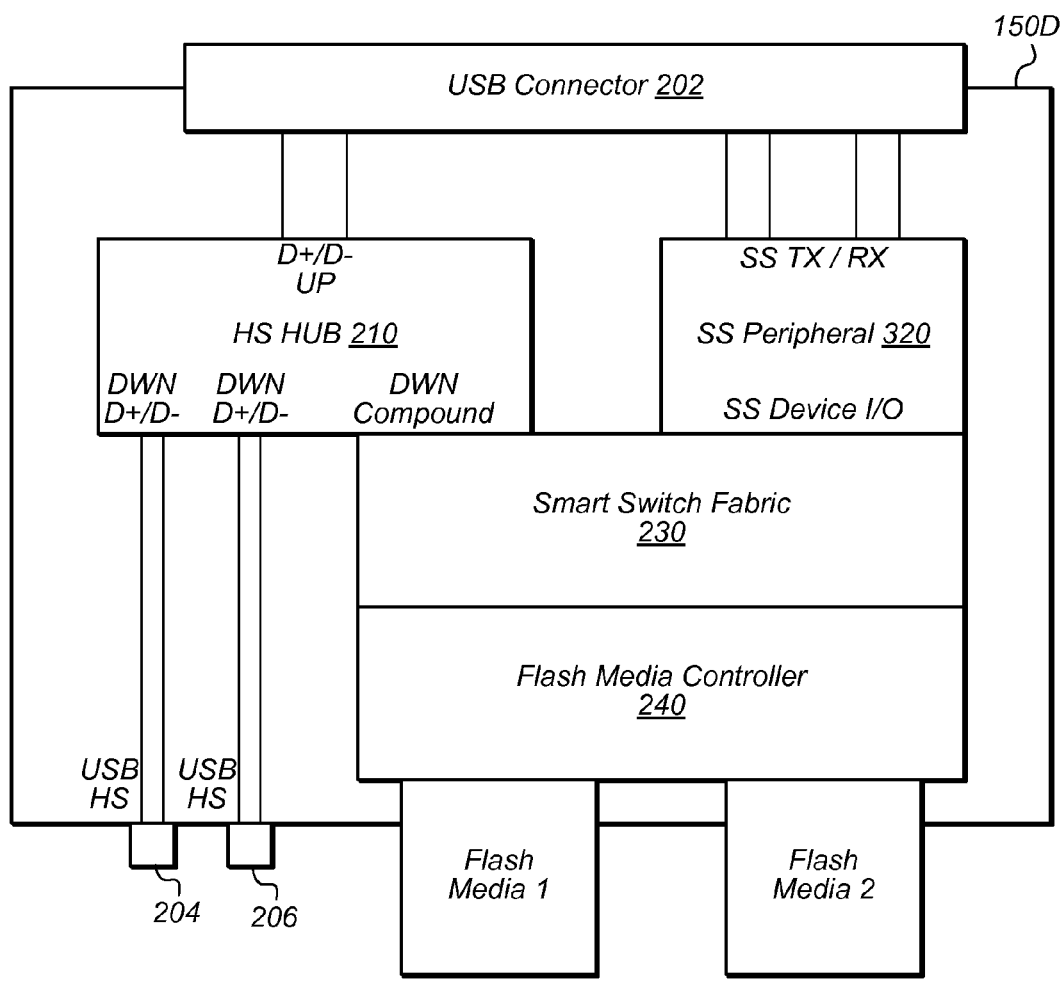

Accordingly, FIGS. 3A and 3B describe a hub apparatus which reduces the power and size of the super speed components of the hub 150A and 150B. Removal of the super speed hub 220 may also improve time to market since the super speed peripheral IP is very well tested and available while the super speed hub IP is not tested and not available at this time.

FIGS. 3A and 3B—Hub Apparatus Including High Speed Hub and Super Speed Device

FIGS. 3A and 3B provide an alternative of the hub 150 in FIGS. 2A and 2B, where, in the hub apparatus 150C of FIG. 3A, a single device 300 is coupled (e.g., directly) to the super speed portion of the upstream port 202 and the high speed hub 210 is coupled to the HS/FS/LS portion of the same upstream port 202. As shown in FIG. 3A, one of the high speed hub 210's downstream ports is connected to the high speed port of the device 300, while the other downstream ports can be coupled to any other additional HS, FS or LS devices. Thus, the device 300 may be configured to communicate with a host device using a first speed via the hub 210 (e.g., at LS/FS/HS) or at a higher speed via the upstream port 202 (e.g., at SS). In some embodiments, the device 300 may be able to operate at both speeds simultaneously, using the hub 210 and the upstream port 202 to communicate with the host device at the two different speeds. This may be used to communicate with different portions of the device 300 (e.g., different memories coupled to or embedded in the device 300) or for additional speeds.

In some embodiments, the device 300 may have different connections for the different speeds. Accordingly, first speed connections (e.g., low speed/full speed/high speed connections) may be coupled to the downstream port of the hub 210 and higher speed (e.g., super speed) connections may be connected to the upstream port 202. In some embodiments, the first speed connections may be D+/D− high speed or full speed USB connections and the higher speed connections may be TX+/TX− and RX+/RX− super speed USB connections. In some embodiments, all of these connections may be intended for inclusion in a single cable (e.g., in a single USB cable) but may be divided into the groups above in order to achieve the functionality depicted in FIGS. 3A and 3B.

In FIG. 3B, a more particular embodiment is shown, similar to FIG. 2B above. In this embodiment of hub apparatus 150D, the super speed hub 220 of FIG. 2B is replaced by the super speed peripheral 320, which is similarly coupled to the smart switch fabric 230. In this embodiment, the device 300 may be composed of peripheral 320, smart switch fabric 230, and flash media controller 240. However, this configuration can be described in a different manner where SS peripheral 320 is a super speed device which allows the smart switch fabric 230 and the flash media controller 240 to communicate via super speed. For the remainder of the description, SS peripheral 320, smart switch fabric 230, and flash media controller 240 will be considered as a single device, e.g., as an embodiment of the device 300. Thus, in the embodiment of hub apparatus 150D of FIG. 3B, the hub 220 of FIG. 2B is removed and replaced by SS peripheral 320 which is a portion of the device 300.

Note that the flash media 1 and 2 may be internal flash memories or may be removable flash media (e.g., where the flash media controller 240 corresponds to a card reader). For example, in the case of removable media, flash media 1 and 2 may be any of compact flash, smart disk (SD/MMC), memory stick, xD-Picture Card, or any other type of removable flash media. In one embodiment, one media may be attached to the high speed hub 210 and another may be attached to the super speed peripheral 320, e.g., for simultaneous use of super speed and high speed with the host device. Such configurations may be achieved via vendor configuration means, such as SPI, I2C, USB HS, SS controller, or other sideband signals.

Additionally, note further that while FIG. 3B is illustrated with the specific embodiment of flash media, it may be extended to any number of embedded devices, such as providing a network connection, a hard disk drive connection, or any other type of embedded function (e.g., involving USB conversion). Similar remarks apply to the Figure of 2B.

In the embodiments of FIGS. 3A and 3B, the hub apparatus 150 (hub apparatus 150C of FIG. 3A and hub apparatus 150D of FIG. 3B) is a new type of compound device which integrates the device 300 with the HS/FS hub 220 (and optionally the HS/FS/LS devices) into a single device (hub apparatus 150). Note that the hub apparatus 150 of FIGS. 3A and 3B may not be a "USB 3.0 hub" according to USB 3.0 definitions, since a USB 3.0 hub includes both a super speed hub and a high speed hub (e.g., as shown in FIGS. 2A and 2B). Similarly, the device 300 may be considered a "super speed device" under USB definitions. However, in alternate embodiments it may not, e.g., if the device is capable of utilizing both super speed and high speed (or full or low speed) simultaneously or when the device utilizes two different physical cables for LS/FS/HS and SS. In some embodiments, the hub apparatus 150 may be able to operate at the fourth tier of the USB gold tree (or lower) due to the internal high speed hub 210. However, because of the removal of the super speed hub 220, the super speed peripheral may be able to operate at the fifth tier (or lower), but the high speed hub may notify the user to move up one tier for HS support (e.g., by plugging the hub apparatus 150 into a USB chain that is closer to the host device 100). Note that when the host device 100 supports super speed, the host device 100 may not be able to detect that the device 300 is at the same tier of the high speed hub 210.

The configuration presented in FIGS. 3A and 3B may not be realizable in a standard system because, in a standard system, the upstream port of a component will always have its high speed and super speed upstream ports connected both to hubs, or both to devices. The new configuration of FIGS. 3A and 3B instead creates connectivity with the high speed side to a hub, and the super speed side directly to the device 300. Thus, FIGS. 3A and 3B illustrate the hub apparatus 150 as a compound device which integrates the high speed hub 210 and the device 300, and optionally one or more additional HS/FS/LS devices.

As indicated above, the configurations presented in FIGS. 3A and 3B allow for more efficient implementation of connectivity of a single super speed device (320) and two or more HS/FS/LS devices because there is no need to implement the super speed portion of the USB 3.0 Hub. By omitting the super speed hub from the interconnect, area and power savings are achieved while continuing to fully support USB 3.0 operation of the device 300. Thus, in FIGS. 3A and 3B, the hub apparatus' (150C and 150D) size and power requirements are reduced since the downstream super speed repeater, downstream super speed PHYs, and considerable hub routing and control logic are no longer necessary.

Figure 4:
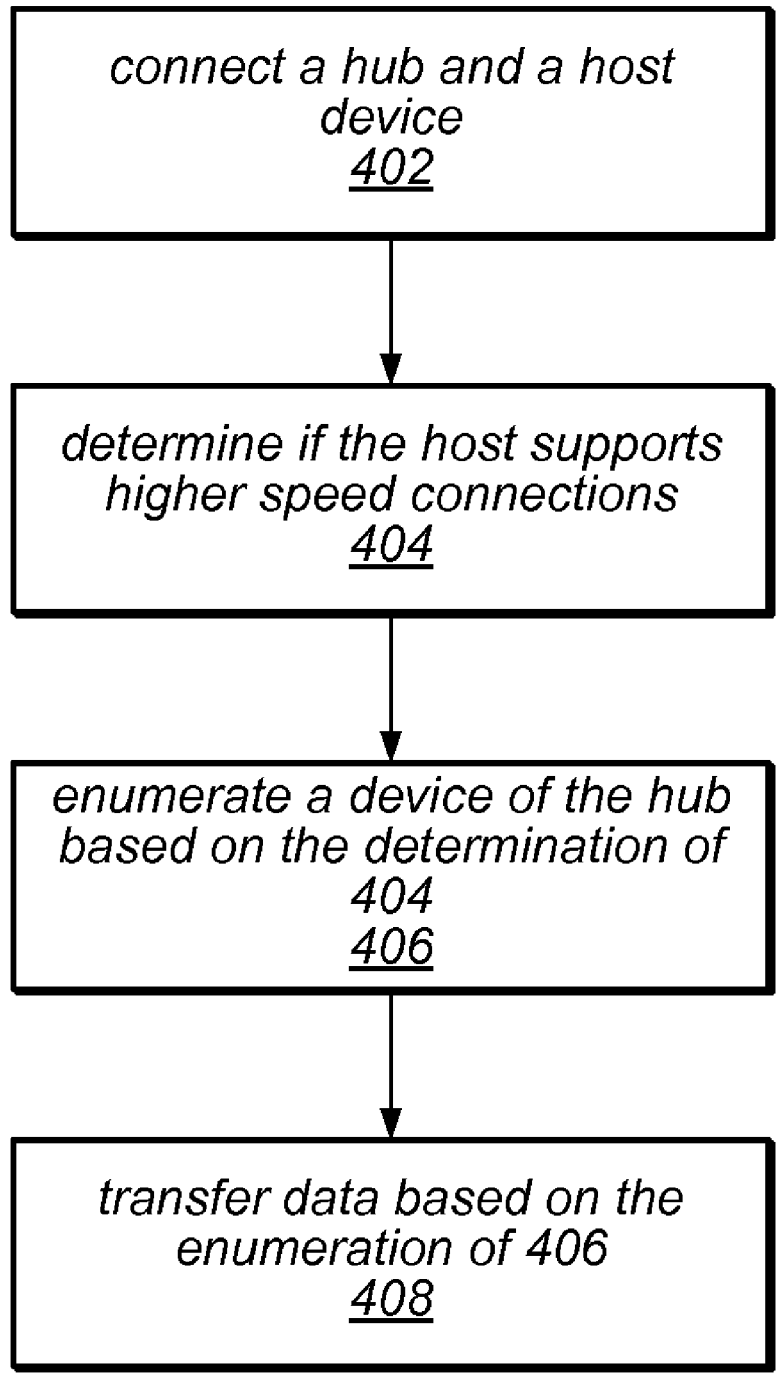
FIG. 4 is a flowchart diagram illustrating an embodiment of a method for supporting high speed and super speed devices in a single device.

FIG. 4—Supporting High Speed and Super Speed Connections

FIG. 4 illustrates a method for supporting both high speed and super speed connections for a device (e.g., the device 300). The method shown in FIG. 4 may be used in conjunction with any of the systems or devices described herein, among other devices. In various embodiments, some of the method elements shown may be performed concurrently, in a different order than shown, or may be omitted. Additional method elements may also be performed as desired. As shown, this method may operate as follows.

In 402, a connection may be established between a hub apparatus (e.g., the hub apparatus 150) and a host device (e.g., the host device 100). As described above, the hub apparatus may include an upstream port for connecting the hub apparatus to the host devices as well as one or more downstream ports, e.g., for connecting devices, such as high speed USB devices. The hub apparatus may include an internal hub (e.g., the hub 210) that operates at a first speed (e.g., USB high speed/full speed) and is coupled to the upstream port and the one or more downstream ports. Additionally, the hub apparatus may include a device (e.g., the device 300) capable of operating at the first speed and a higher speed (e.g., a USB super speed). The device may be coupled to a port of the internal hub and the upstream port.

In 404, it may be determined if the host supports higher speed connections, e.g., USB super speed connections. In one embodiment, the determination in 404 may be performed during enumeration after the connection in 402. For example, the higher speed device may attempt to enumerate with the host device according to higher speed protocols.

Accordingly, if the host device supports higher speed connections, in 406, the device may be enumerated as a higher speed device. Additionally, during enumeration and regardless of the support of the higher speed device, the internal hub may be enumerated according to typical protocols, e.g., USB high speed protocols. Additionally, any devices also coupled to the internal hub may be enumerated according to typical protocols.

However, if the host device does not support higher speed connections, enumeration may be performed in a different manner. For example, the device may not be enumerated as a higher speed device, but instead may be enumerated as a device at the first speed according to typical protocols, e.g., as a USB high speed device. The USB high speed device may be enumerated at the same level as the internal hub or as a device of the internal hub.

As a more concrete example, e.g., following the embodiments of FIGS. 2B and 3B, the device may be a USB super speed device which includes a flash media controller for reading data from one or more flash mediums. If the host device supports USB super speed, the flash media controller may be enumerated as a USB super speed device (via the super speed peripheral circuitry, e.g., peripheral 320), and the data may be read at USB super speeds. However, if the host device does not support USB super speed, the USB super speed circuitry may not be used, and instead, the device (e.g., the flash media controller included in the device) may be enumerated as a USB high speed device of the high speed hub. Thus, in one embodiment, where super speeds are not available, the internal hub may allow for the use of the flash media controller without using the USB super speed peripheral circuitry.

However, in further embodiments, where the host device supports higher speed connections, the device may be configured to operate as both a higher speed device and a first speed device. For example, the device may include circuitry for performing different functionality, e.g., for reading a first memory and a second memory. In some embodiments, the first memory could be enumerated and communicated at the higher speed while the second memory could be enumerated and communicated at the first speed. Alternatively, the device may be able to utilize a combined speed of the first speed and the higher speed (thereby achieving a data transfer speed of the combination of the two speeds, e.g., which may be 10% higher than the higher speed alone, in the case of USB high speed and super speed). Thus, in some embodiments, the device may be able to utilize both the first speed and the higher speed simultaneously.

Additionally, the decision to communicate at the higher speed may also be based on other criteria (i.e., other than simply the speeds supported by the host device). For example, the battery level of the device, the type of data being transferred, etc. may be used to determine whether to use the higher speed even when it is supported by the host device. As one specific example, the higher speed circuitry and transfer may require more power than operation at the first speed. Accordingly, where higher speed data transfers are not necessary (e.g., where the amount of data being transferred is small or not critical), the device may be enumerated and operated at the first speed instead of the higher speed. Such operation may conserve battery power, e.g., where the device or the hub utilizes a battery.

In 408, data may be transferred between the host device and the hub apparatus based on the determination and enumeration of 404 and 406. For example, if the device is enumerated as a higher speed device, then data transfer may be performed at a speed that is higher than that provided by the hub that operates at the first speed. Alternatively, if the device is not enumerated as a higher speed device, data transfer may be performed at a lower speed, e.g., the first speed.

FIGS. 5-9—Exemplary Embodiments and Use Cases

FIGS. 5-9 provide exemplary embodiments and use cases corresponding to the systems and methods described above. While these Figures correspond closely to FIGS. 2B and 3B, they may be generalized to the functionality shown in FIGS. 2A and 3A. Additionally, the following description is exemplary only and does not limit the scope of the descriptions and methods provided above.

Figure 5:
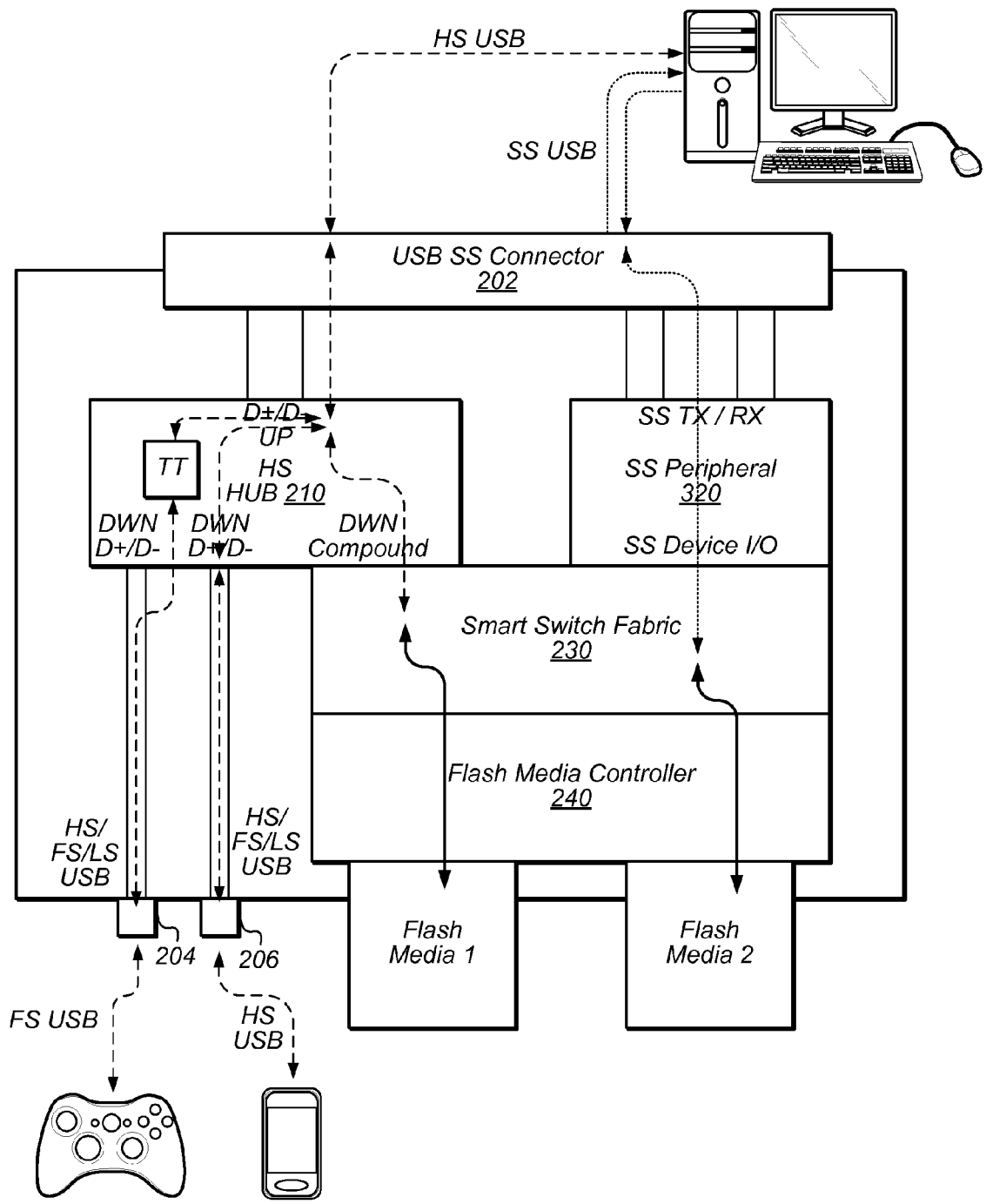
FIGS. 5-9 are exemplary use cases corresponding to FIGS. 3A-4.

In FIG. 5, a PC Desktop/Laptop/Netbook is connected to the hub 210 and is running a super speed session to the flash media 2, which may be SD, uSD, eMMC or any other removable or non-removable media. The PC Desktop/Laptop/Netbook is simultaneously running a high speed session, which is attached to the high speed USB hub 210. The high speed hub 210 has three or more down stream ports attached to the following devices:

high speed iPod/MP3 Player downloading music/video from PC.

full speed/low speed game controller which is running a game on the PC.

Flash Media 1, which can be SD, uSD, eMMC, or any other removable or non-removable media. This media is receiving (sinking) or transmitting (sourcing) music, video, documents, or other data to the PC host.

Figure 6:
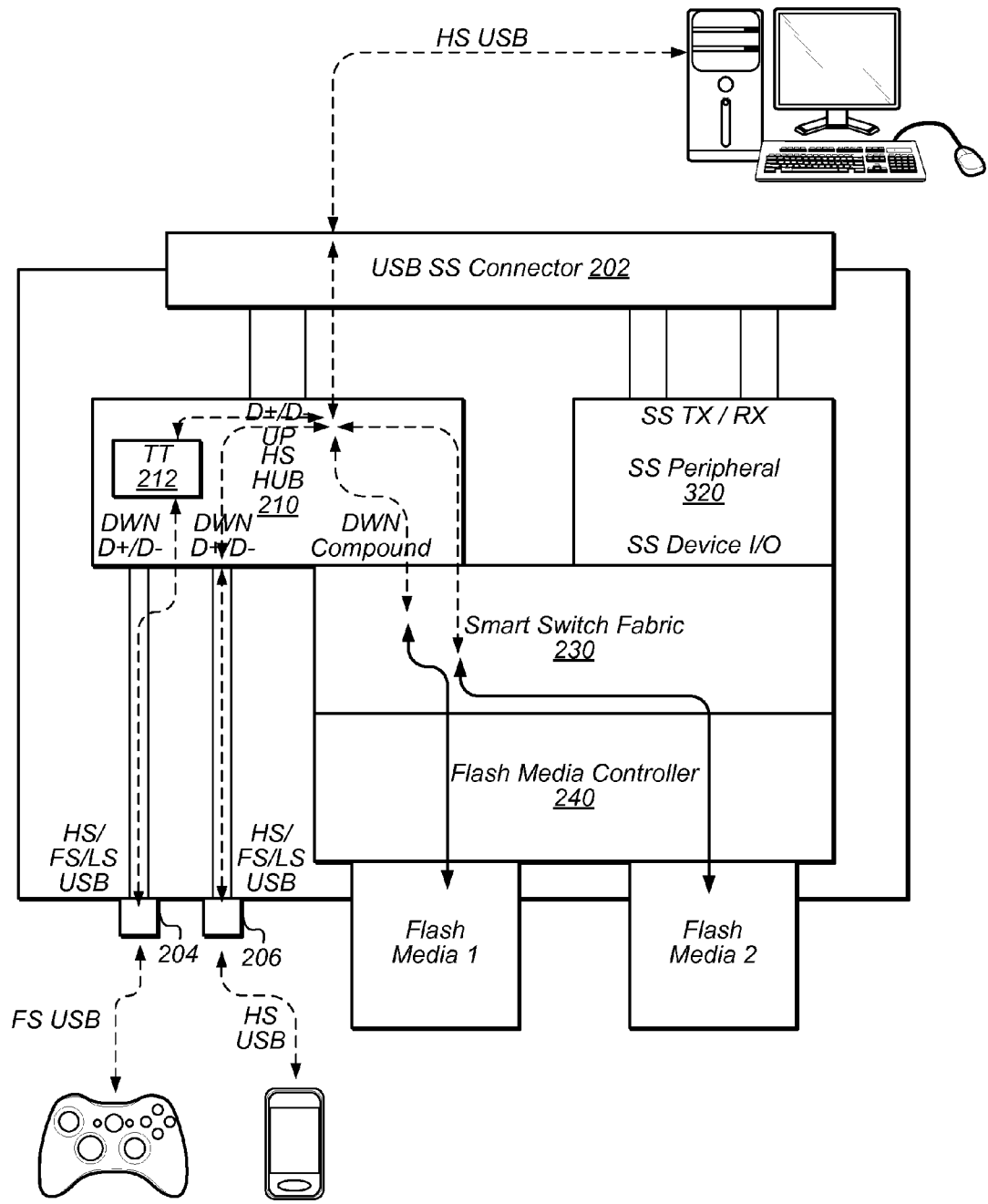

In FIG. 6, the host supports high speed USB only. No Super speed support is possible in this case. Thus, when the host is high speed only the super speed peripheral 320 may not be in use. Accordingly, in FIG. 6, the smart switch fabric 230 may allocate both flash media to the high speed hub 210. More specifically, the smart switch fabric 230 may allocate a high speed USB address and the flash media port 2 may be enumerated as a mass storage or MTP media.

The remaining connections are the same as FIG. 5. As shown, the high speed hub includes a Transaction translator (TT) 212 which converts the high speed traffic to full speed or low speed downstream and upstream from the full speed or low speed device (in this case, full speed for the game controller). The iPod/MP3 player is operating in a high speed USB session using the high speed repeater path of the high speed hub.

Note that the case of a full speed only host would be nearly the same as the high speed only host. Similar to the high speed only case, the super speed peripheral is not in use. The down stream devices are now all full speed, so the game controller is FS/LS and the iPod/MP3 player will fall back to FS. Flash media 1 and flash media 2 will be treated as full speed devices.

Figure 7:
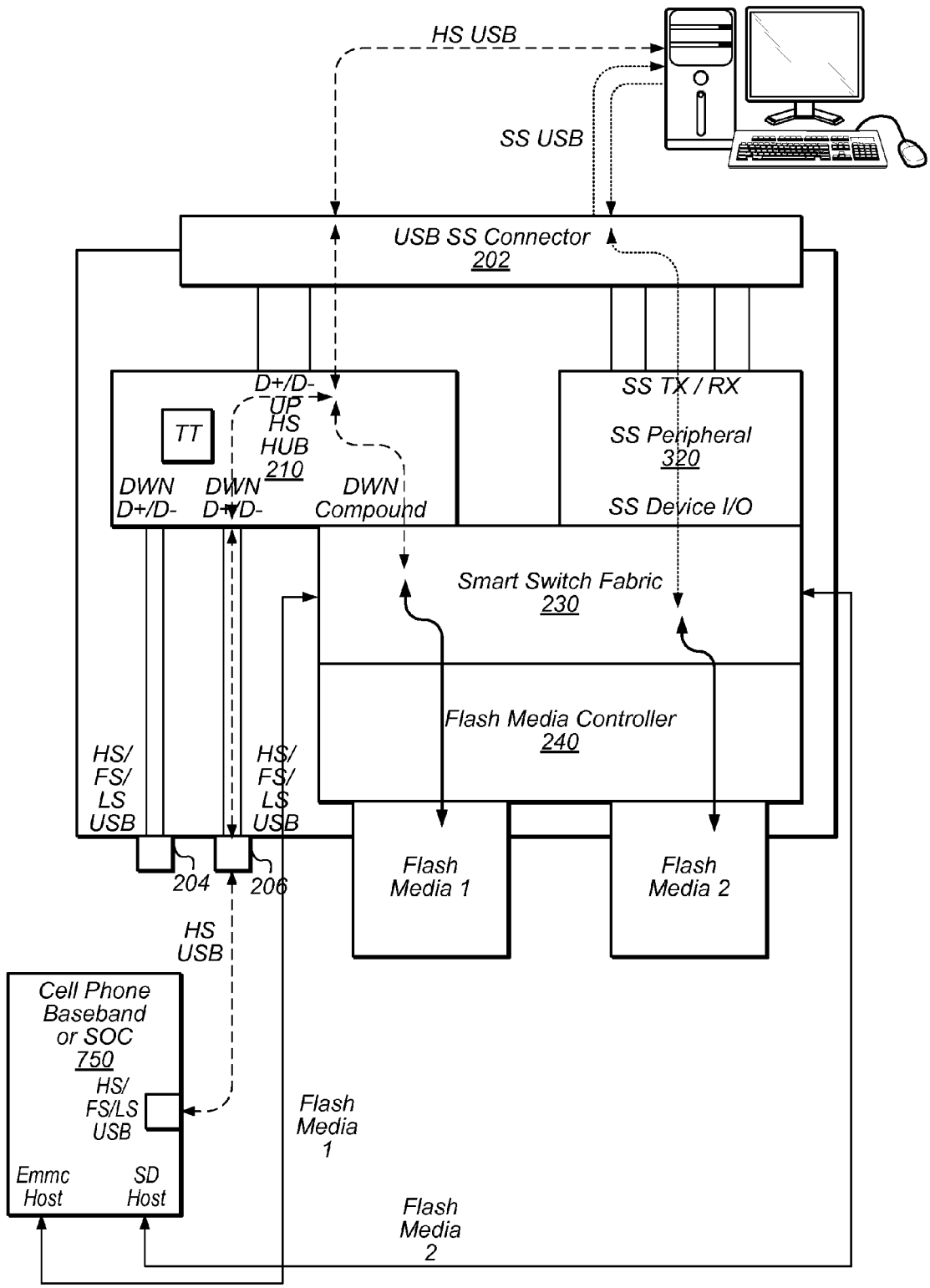

In FIG. 7, a cell phone handset 750 (e.g., the baseband of the cell phone handset 750) is coupled to a downstream port of the high speed hub 210. The host may use typical high speed USB to communicate and/or control the cell phone baseband. This may be useful for legacy USB composite devices that occur in cell phones. For example, the handset SMS text messaging may be supported by a GUI in the host device. By supporting legacy USB, drivers used by the baseband may not have to be rewritten.

In this embodiment, the flash media may or may not be removable. Similar to previous figures, the flash media is shared with the smart switch fabric 230 which arbitrates the access to the flash media. The host again has high speed and super speed sessions running, similar to the embodiment of FIG. 5.

However, in this Figure, the smart switch fabric also arbitrates access to flash media 1 and 2 from the cell phone 750. More specifically, in the embodiment shown, the flash media 2 may be accessible by the host over SS USB or by SOC SD Host of the cell phone 750. Similarly, flash media 1 is accessible by the host and over eMMC host from the baseband SOC of the cell phone 750. The cell phone may communicate these commands via USB or via other methods, e.g., sidebanding.

Figure 8:
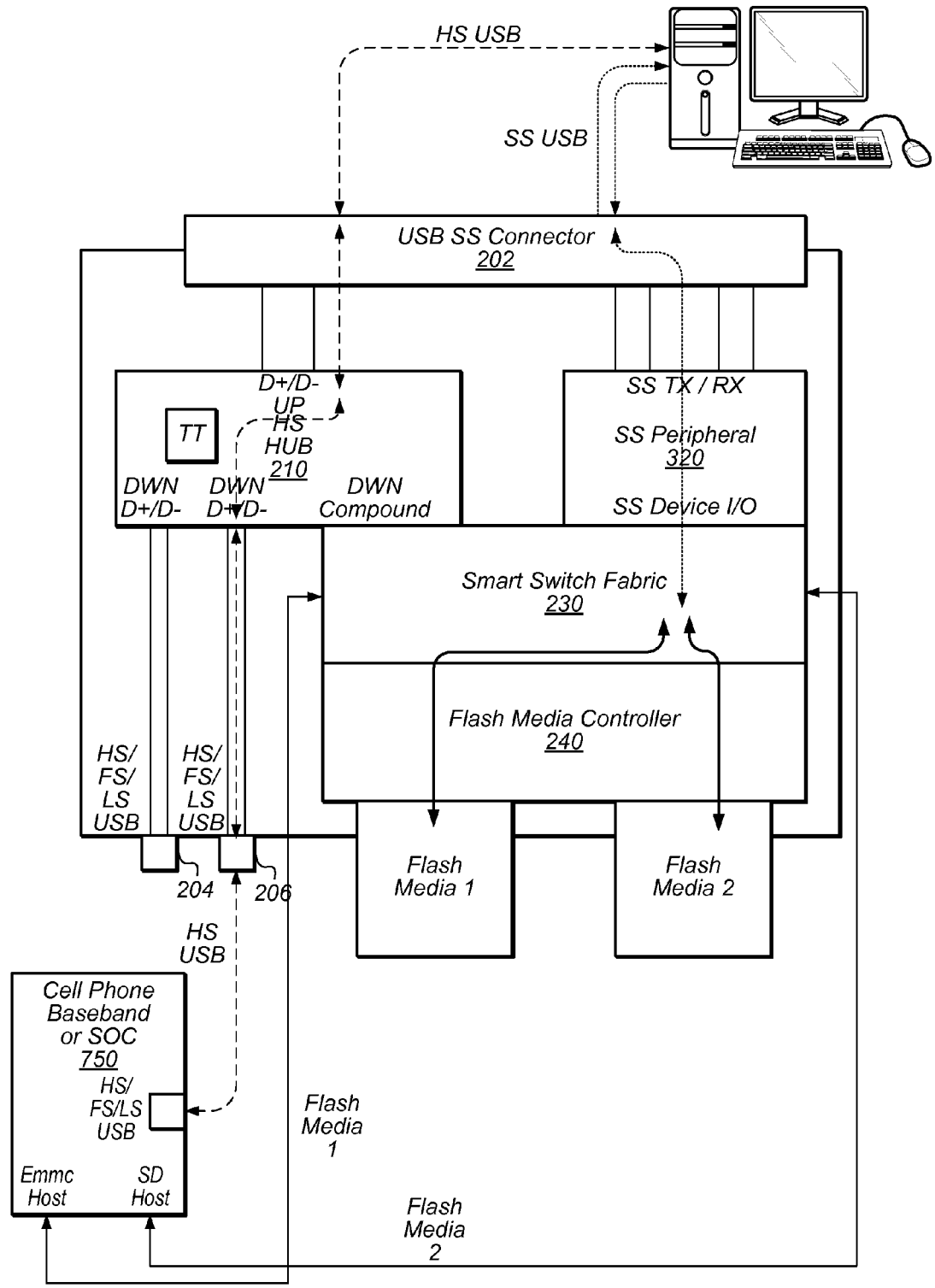

In FIG. 8, the smart switch fabric 230 has "doubled up" to use the super speed bandwidth by allocating both flash media devices to the USB super speed host of the host device. The baseband of cell phone 750 may continue to access the host via the high speed USB hub as in the previous Figure.

In this embodiment, either flash media may be rapidly read or written by the super speed host controller. Likewise, the cell phone 750 may, as one example, mount the flash media 1 and media 2 for cloud computing updates on the media.

Figure 9:
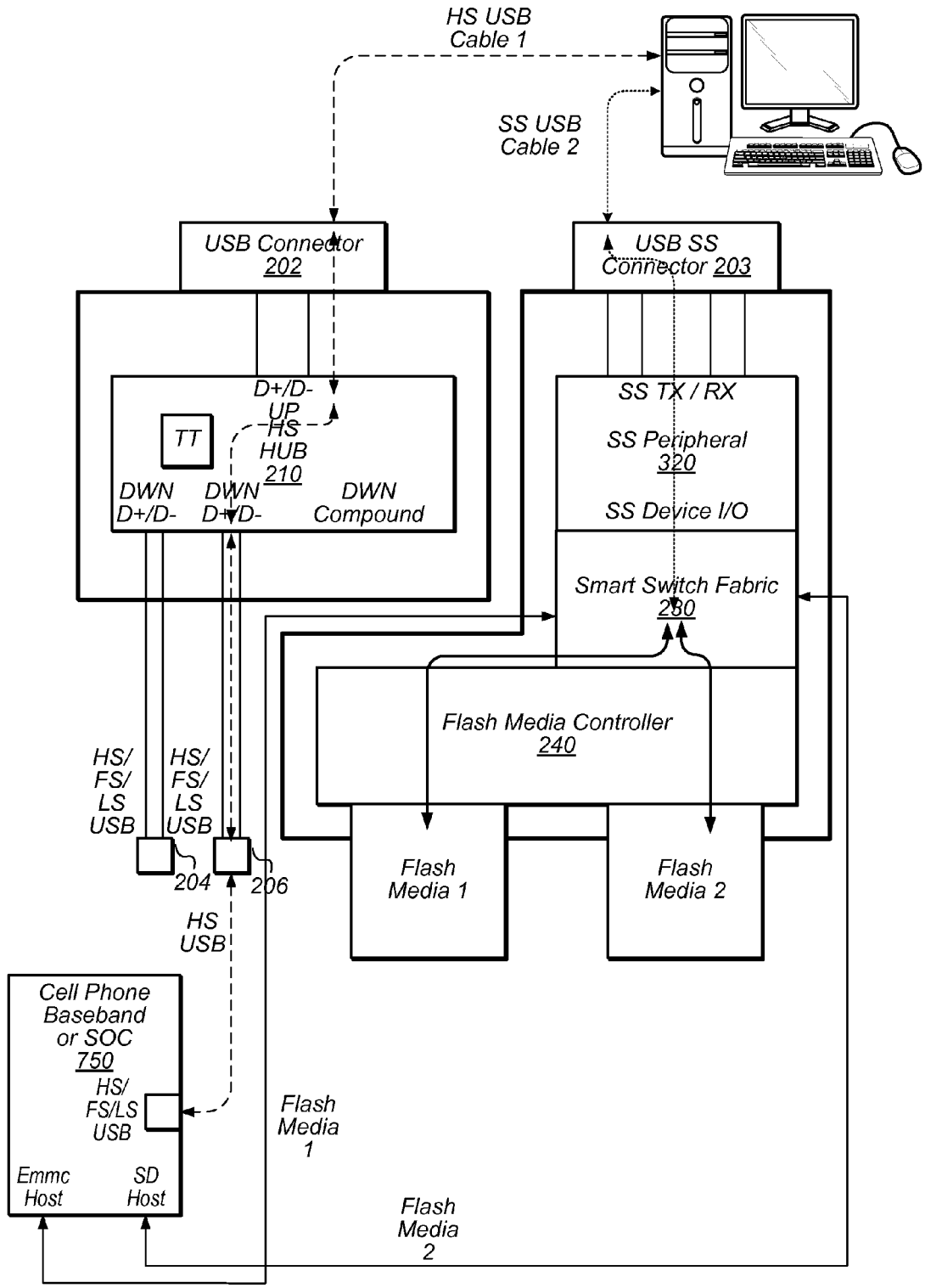

In FIG. 9, a discrete implementation is shown. In this embodiment, the host device has two ports operating: one port is a high speed USB port for the high speed hub 210 and the other is a USB 3.0 port with both High Speed and Super Speed capability to the super speed device 320.

In this example, two cables connect these two functions to the host device. However, to the host device software stack FIG. 9 may not be different from the previous figures which have a single cable containing SS lanes to/from the host device when operating in Super Speed mode.

Thus, by combining the two devices into a single hub apparatus 150, as in the previous Figures, an interconnect cable has been eliminated from the customer's application compared to a standard USB implementation. This may be important since a single cable is used to make the connection between the host device and the hub apparatus 150 rather than two. Additionally, the discrete embodiment of FIG. 9 requires two connectors and two power supplies for implementation. Thus, in the previous Figures, power and space are reduced by combination of the super speed peripheral 320 and the high speed hub 210.

Note that in all the configurations or examples shown regarding FIGS. 3A-9, there is no loss of utility when lacking a super speed hub.

Further Embodiments

Note that while many embodiments described above focus on an embedded super speed device, it may also be possible for the super speed device to be an external device which is coupled to the hub apparatus. For example, the super speed connections shown in the above Figures may be "pass through" connections to an external port, where an external super speed device may connect.

Additionally, while the above descriptions focused largely on USB 2.0 and USB 3.0 (e.g., high speed and super speed connections and devices), the methods may be generalized to any of various hubs, e.g., for serial communications. For example, the same types of configurations may be used between USB 3.0 and USB 4.0 or between a USB configuration and a fiber optic configuration, as desired. Thus, the embodiments described above may be generalized to any number of devices which require backwards compatibility.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system, comprising:
an enclosure;
at least one upstream port for coupling to a host device, wherein the at least one upstream is comprised in the enclosure;
at least one downstream port for coupling to at least one first-speed downstream device, wherein the at least one downstream port is comprised in the enclosure;
an embedded device coupled to the upstream port and comprised in the enclosure, wherein the embedded device is configured to communicate with the host device using a first speed or a higher speed that is higher than the first speed, wherein the embedded device is not a hub;
an internal hub coupled to the at least one upstream port, the embedded device, and the at least one downstream port, wherein the internal hub is configured to provide a connection between the host device and the at least one downstream port at the first speed, wherein the internal hub is comprised in the enclosure;
wherein, when supported by the host device, the embedded device is configured to communicate with the host device at the higher speed via the at least one upstream port without using the internal hub;
wherein, when the host device does not support the higher speed, the internal hub is configured to provide a connection between the host device and the embedded device at the first speed.

2. The system of claim 1, wherein the system is a USB device, wherein the internal hub is a high speed USB hub, wherein the first speed is USB high speed, and wherein the higher speed is USB super speed.

3. The system of claim 1, wherein, when supported by the host device, the embedded device is further configured to communicate with the host device at the first speed utilizing the internal hub simultaneously with the communication with the host device at the higher speed.

4. The system of claim 1, wherein, the embedded device is further configured to communicate with the host device at the higher speed based on criteria in addition to the support of the host device of the higher speed.

5. The system of claim 4, wherein the criteria comprises a battery level of the embedded device.

6. The system of claim 4, wherein the criteria is based on data or bandwidth for transfer between the embedded device and the host device.

7. The system of claim 1, wherein the embedded device is a USB 3.0 device.

8. The system of claim 1, wherein the embedded device comprises a card reader.

9. The system of claim 1, wherein the embedded device provides an Ethernet connection.

10. The system of claim 1, wherein the embedded device provides a hard drive connection.

11. A method, comprising:
determining whether a host device supports a first speed or a higher speed, wherein the higher speed is higher than the first speed, wherein said determining is performed after connecting a hub apparatus to the host device;
performing enumerating of a device coupled to an internal hub of the hub apparatus, wherein said performing enumeration is performed at the first speed;
performing enumeration of an embedded device comprised in the hub apparatus based on said determining, wherein said enumerating comprises enumerating the embedded device as a first speed device via the internal hub of the hub apparatus if the host device does not support the higher speed, wherein said enumerating comprises enumerating the embedded device as a higher speed device if the host device does support the higher speed, wherein the embedded device is not a hub;
the embedded device communicating with the host device at the higher speed or the first speed based on said enumerating.

12. The method of claim 11, wherein the hub apparatus is a USB hub, wherein the internal hub is a high speed USB hub, wherein the first speed is USB high speed, and wherein the higher speed is USB super speed.

13. The method of claim 11, wherein, when the host device supports the higher speed the embedded device is enumerated as a higher speed device, and wherein the method further comprises:
performing enumeration of the embedded device as a first speed device via the internal hub of the USB hub apparatus if the host device does not support the higher speed;
wherein said communicating with the host device comprises the embedded device communicating with the host device at the higher speed and the first speed simultaneously.

14. The method of claim 11, wherein said performing enumeration is based on criteria in addition to the support of the host device of the higher speed.

15. The method of claim 14, wherein the criteria comprises a battery level of the embedded device.

16. The method of claim 14, wherein the criteria is based on data or bandwidth for transfer between the embedded device and the host device.

17. The method of claim 11, wherein the embedded device is a USB 3.0 device.

18. The method of claim 11, wherein the embedded device comprises a card reader.

19. The method of claim 11, wherein the embedded device provides an Ethernet connection.

20. The method of claim 11, wherein the embedded device provides a hard drive connection.

21. A system, comprising:
an enclosure;
at least one upstream port for coupling to a host device, wherein the at least one upstream is comprised in the enclosure;
at least one downstream port for coupling to at least one first-speed downstream device, wherein the at least one downstream port is comprised in the enclosure;
an embedded card reader coupled to the upstream port and comprised in the enclosure, wherein the embedded card reader device is configured to communicate with the host device using a first speed or a higher speed that is higher than the first speed;
an internal hub coupled to the at least one upstream port, the embedded card reader, and the at least one downstream port, wherein the internal hub is configured to provide a connection between the host device and the at least one downstream port at the first speed, wherein the internal hub is comprised in the enclosure;
wherein, when supported by the host device, the card reader is configured to communicate with the host device at the higher speed via the at least one upstream port without using the internal hub;
wherein, when the host device does not support the higher speed, the internal hub is configured to provide a connection between the host device and the embedded card reader at the first speed.

22. A system, comprising:
an enclosure;
at least one upstream port for coupling to a host device, wherein the at least one upstream is comprised in the enclosure;
at least one downstream port for coupling to at least one first-speed downstream device, wherein the at least one downstream port is comprised in the enclosure;
an embedded network device coupled to the upstream port and comprised in the enclosure, wherein the embedded network device is configured to communicate with the host device using a first speed or a higher speed that is higher than the first speed, wherein the embedded network device is configured to provide a network connection;
an internal hub coupled to the at least one upstream port, the embedded network device, and the at least one downstream port, wherein the internal hub is configured to provide a connection between the host device and the at least one downstream port at the first speed, wherein the internal hub is comprised in the enclosure;
wherein, when supported by the host device, the embedded network device is configured to communicate with the host device at the higher speed via the at least one upstream port without using the internal hub;
wherein, when the host device does not support the higher speed, the internal hub is configured to provide a connection between the host device and the embedded network device at the first speed.

* * * * *